US011544152B2

(12) United States Patent
Savir et al.

(10) Patent No.: US 11,544,152 B2
(45) Date of Patent: Jan. 3, 2023

(54) LEVERAGING SENTIMENT IN DATA PROTECTION SYSTEMS

(71) Applicant: EMC IP Holding Company LLC, Hopkinton, MA (US)

(72) Inventors: Amihai Savir, Sansana (IL); Assaf Natanzon, Tel Aviv (IL); Avitan Gefen, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 698 days.

(21) Appl. No.: 16/516,952

(22) Filed: Jul. 19, 2019

(65) Prior Publication Data

US 2021/0019235 A1 Jan. 21, 2021

(51) Int. Cl.
*G06F 11/14* (2006.01)
*G06F 40/30* (2020.01)
*G06F 40/279* (2020.01)

(52) U.S. Cl.
CPC ........ *G06F 11/1469* (2013.01); *G06F 40/279* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 2016/0119365 A1* | 4/2016 | Barel | G06F 16/95 726/12 |
| 2017/0300472 A1* | 10/2017 | Parikh | G06F 40/205 |
| 2018/0004948 A1* | 1/2018 | Martin | H04L 63/1425 |
| 2018/0189146 A1* | 7/2018 | Banasik | G06F 11/1461 |
| 2018/0359281 A1* | 12/2018 | Ng | H04L 63/1433 |
| 2020/0133559 A1* | 4/2020 | Auvenshine | G06F 3/0605 |

OTHER PUBLICATIONS

Hernández, Aldo, Victor Sanchez, Gabriel Sánchez, Héctor Pérez, Jesús Olivares, Karina Toscano, Mariko Nakano, and Victor Martinez. "Security attack prediction based on user sentiment analysis of Twitter data." 2016 IEEE international conference on industrial technology (ICIT), pp. 610-617. IEEE, 2016 (Year: 2016).*

* cited by examiner

*Primary Examiner* — Frank D Mills
(74) *Attorney, Agent, or Firm* — Workman Nydegger

(57) ABSTRACT

Systems and methods for providing data protection operations including cyber-threat protection operations. A sentiment analysis may be performed using language analysis to identify or determine a general or specific sentiment with or without intent to do harm. A score of the sentiment is then determined to assess risk. The data backup policy can be updated based on the assessed risk.

19 Claims, 2 Drawing Sheets

LEVERAGING SENTIMENT IN DATA PROTECTION SYSTEMS

FIELD OF THE INVENTION

Embodiments of the invention relate to data protection systems, apparatus, and methods. Embodiments of the invention further relate to systems and methods for protecting data in primary and backup storage systems and more particularly to systems and methods for adapting data protection policies based on risk estimations.

BACKGROUND

Data stored in computing systems, in addition to being subject to failure or corruption. As a result, data protection is an important aspect of computing systems. For example, a typical aspect of data protection is to generate a backup of the production data. Backup data protects the computing system when there is a problem with the primary or production data and the backup data can be used for recovery purposes.

However, data protection has many facets. In addition to failure or corruption, data is also subject to security threats. In fact, bad actors do not limit their attacks to production data. Some threats are also directed at the backup data. A ransomware attack, for example, may target both the primary data and the backup data. Consequently, there is a need to not only protect production data or primary storage, but also to reduce the risks faced by backup data or secondary storage.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
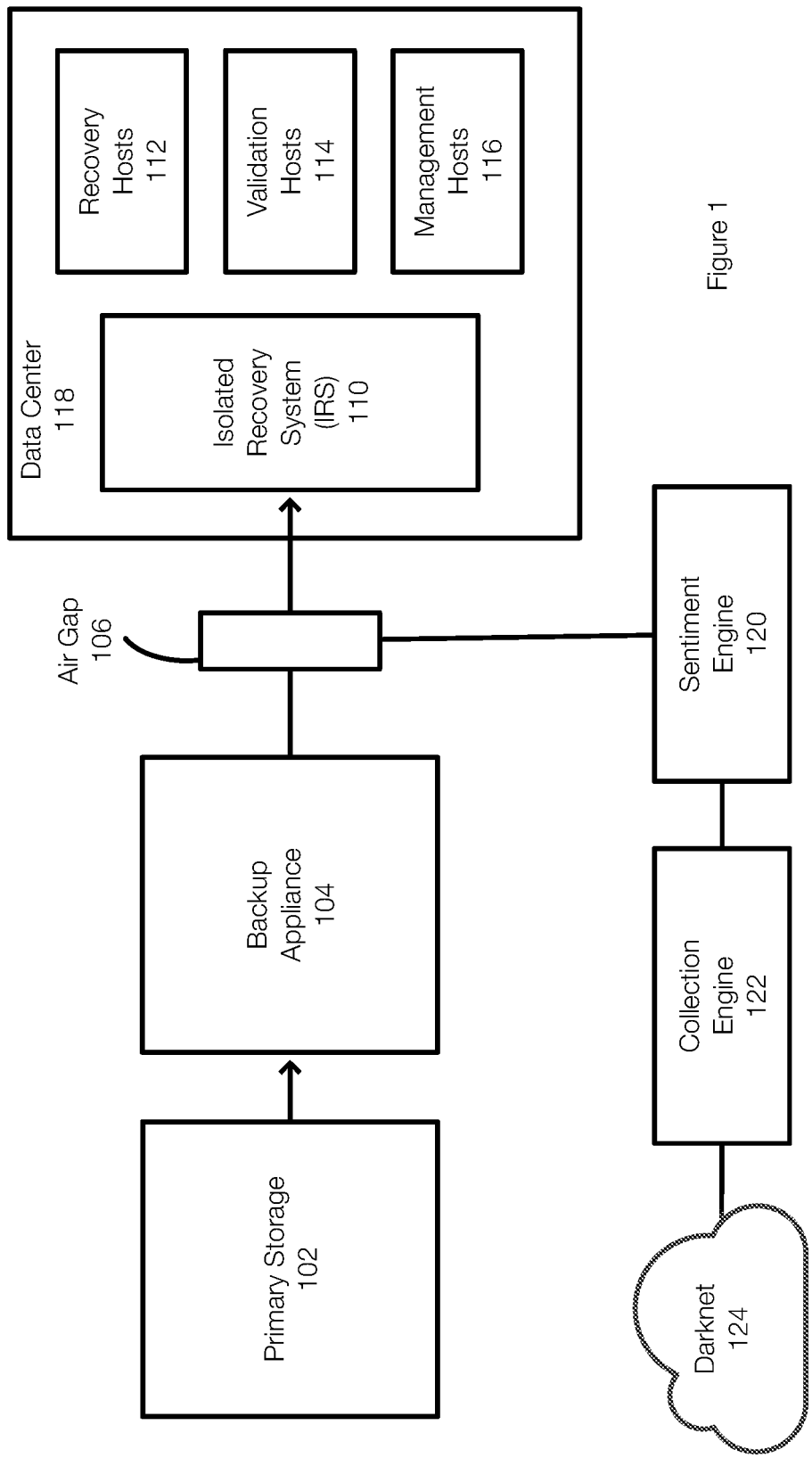
FIG. 1 illustrates an example of a system configured to perform data protection operations including cyber-threat protection operations.

Embodiments of the present invention generally relate to data protection and to systems, methods, and apparatus for performing data protection operations. Examples of data protection operations include, but are not limited to, backup operations, restore operations, replication operations, risk assessment and risk reduction operations (cyber-threat protection operations), or the like. More particularly, embodiments of the invention relate to systems, hardware, software, computer-readable media, and methods for any for assessing, reducing, and/or protecting backup data or secondary storage. More specifically, embodiments of the invention relate to leveraging sentiment to improve data protection operations and/or to change data protection policies based on the risk assessment.

Backup storage systems are often considered to be storage of last resort and embodiments of the invention are configured to protect backup storage systems from security threats such as cyber-attacks. In one example, the backup storage system or the backup sets may be associated with a data protection policy. The backup data sets may be associated with different policies, for example based on content or for other reasons.

Embodiments of the invention evaluate sentiment that may be expressed online in various networks including the darknet to assess risk. Depending on the risk assessment, the backup policy associated with backup storage can be changed or adapted in response to the risk assessment. For example, all communication to the backup storage system may be closed when the risk is high. Alternatively, all communication with the backup storage system may be closed except for short backup windows. These policies provide better security against cyber threats.

Cyber threats include, but are not limited to, worms, ransomware, phishing, malware, spam, spyware, trojan horses, viruses, and the like. In fact, these cyber threats are constantly evolving and changing and, as a result, there is typically little awareness about the most current implementations of these cyber threats.

Embodiments of the invention thus leverage sentiment about potential cyber threats in order to prevent these attacks. Often, information about potential threats may be found on the darknet (or other networks). The darknet is an umbrella term that describes portions of the Internet that are not open to public view. Originally, darknet was a term that described computers that were programmed to receive but not respond or acknowledge anything, which made them invisible. Later, the term was also used for services such as the dark web, which is an overlay network that can be accessed only with specific software, configurations, or authorization, often using non-standard communication protocols and ports. Types of dark webs include friend-to-friend networks (usually used for file sharing with a peer-to-peer connection) and privacy networks such as Tor.

Darknet forum examples include: Hacker world news, Hacking and security, Carding (stealing credit cards and trying to cash them out on the internet), Botnet (a network of bots used to steal data and send spam, or perform DDOS attacks), Electronics and phreaking (phreaking is trying to break someone's security network), Brutus (software used to crack passwords), DDOS (overwhelming a server with requests to shut it down), Malware and exploits, Clothing market (people who use stolen credit cards to buy clothes and resell them), Financial operations, Documentation (passports, driving licenses, citizenships).

Data protection policies may not change based on what is currently happening because, as previously stated, data protection systems may not be aware of real-time cyber risks. If the data protection system were aware of the risk, the behavior of the data protection system may change. Embodiments of the invention improve the ability to adapt to current or real-time or near real time risks by analyzing the sentiment of darknet forums. This allows new cyber-attacks that pose general risks or on specific organizations/industries to be potentially identified such that protection can be adapted for the assessed risk, for example by changing the backup policy.

In one example, sentiment refers to expressions that may be found in a network, such as on a forum, chat room, website, or other location. In one example, darknet sentiment may analyzed using neuro linguistic programming (NLP) to assess or estimate current risks and to adapt or change the backup policy in accordance with the determined risk. Examples of NLP are available to one of skill in the art. Embodiments of the invention allow one of skill in the art, with the benefit of the present disclosure, to protect data by leveraging NLP. This may be implemented, by way of example, in Isolated Recovery Solutions (IRS) such as DELL EMC CYBER RECOVERY SYSTEM.

Cyber recovery relates to systems and methods to prevent a cyber attack from destroying data including backups and replicas. A data protection solution may include an isolated backup storage system such as an isolated data center environment that is or that can be disconnected from other networks. Use can also be restricted to certain users in some examples. In one example, the backup storage system may be associated with one or more policies that can be changed and that may be changed based on the risk of a cyber threat or attack.

FIG. 1 illustrates an example of a system configured to perform data protection operations including cyber-protection operations. FIG. 1 illustrates a backup appliance 104 (e.g., physical and/or virtual appliance) that is configured to provide data protection applications for primary storage 102 (or for a production system). More generally, the backup appliance 104 may be configured to backup systems such as virtual machines and other applications in addition to production data. Generally, these aspects of a computing system are stored on primary storage 102, which may be implemented using various storage devices and systems. Thus, the backup appliance 104 may store backup data or backup data sets. The backup appliance 104 may backup the primary storage 102 at the backup appliance 104 itself and/or in the cloud such as the datacenter 118.

The backup appliance 104 may replicate the backup data to a recovery system operating in a data center 118 or other cloud. In this example, the backup appliance 104 replicates (or backs up) the data to an isolated recovery system 110. The IRS 110 may be associated with recovery hosts 112, validation hosts 114 and management hosts 116. The recovery hosts 112 are examples of hosts that have the replicated data or image. In one example, the recovery hosts store the copy of the image which is in production at a time when connectivity to the IRS 110 is stopped or removed (e.g., using the air gap 106 discussed below). The validation hosts may run different tests on the replication or recovery hosts as well as other threat detection (e.g., malware detection, anti-virus, etc.) to help ensure that the image or data in the recovery hosts is clean and valid. The maintenance hosts manage these processes and may control the air gap as discussed below.

FIG. 1 also illustrates an air gap 106. The air gap 106 is configured to open/close or otherwise control the connectivity of the IRS 110 to network connections. In other words, the air gap 106 allows the IRS 110 to be isolated. The air gap 106 can provide total isolation of the IRS 110 including electromagnetically, electronically, and/or from other networks.

The air gap 106 may be associated with a data protection policy that may be set by a sentiment engine 120. The sentiment engine 120, which may be part of the data protection system such as the backup appliance 104, is configured to identify security threats including cyber-threats and then adapt or change the data protection policy accordingly.

For example, the data protection policy can be to activate the air gap such that the IRS 110 is totally isolated. The duration of this action may depend on the assessed risk and may not change for a predetermined time period or until the risk assessment has changed. In another example, the data protection policy may allow network access to the IRS 110 only during backup or replication operations. In other words, the data protection policy may be open for certain windows of time. The window may be a short or predetermined period of time. The period of time may be divided into discrete time periods.

The sentiment engine 120 may cooperate with a collection engine 122 that is configured to collect data from sources such as the darknet 124. In one example, the collection engine 122 may collect data such as forum discussions from the darknet 124 and/or other sources. The collection engine 122 may also be integrated into the sentiment engine 120.

Figure 2:
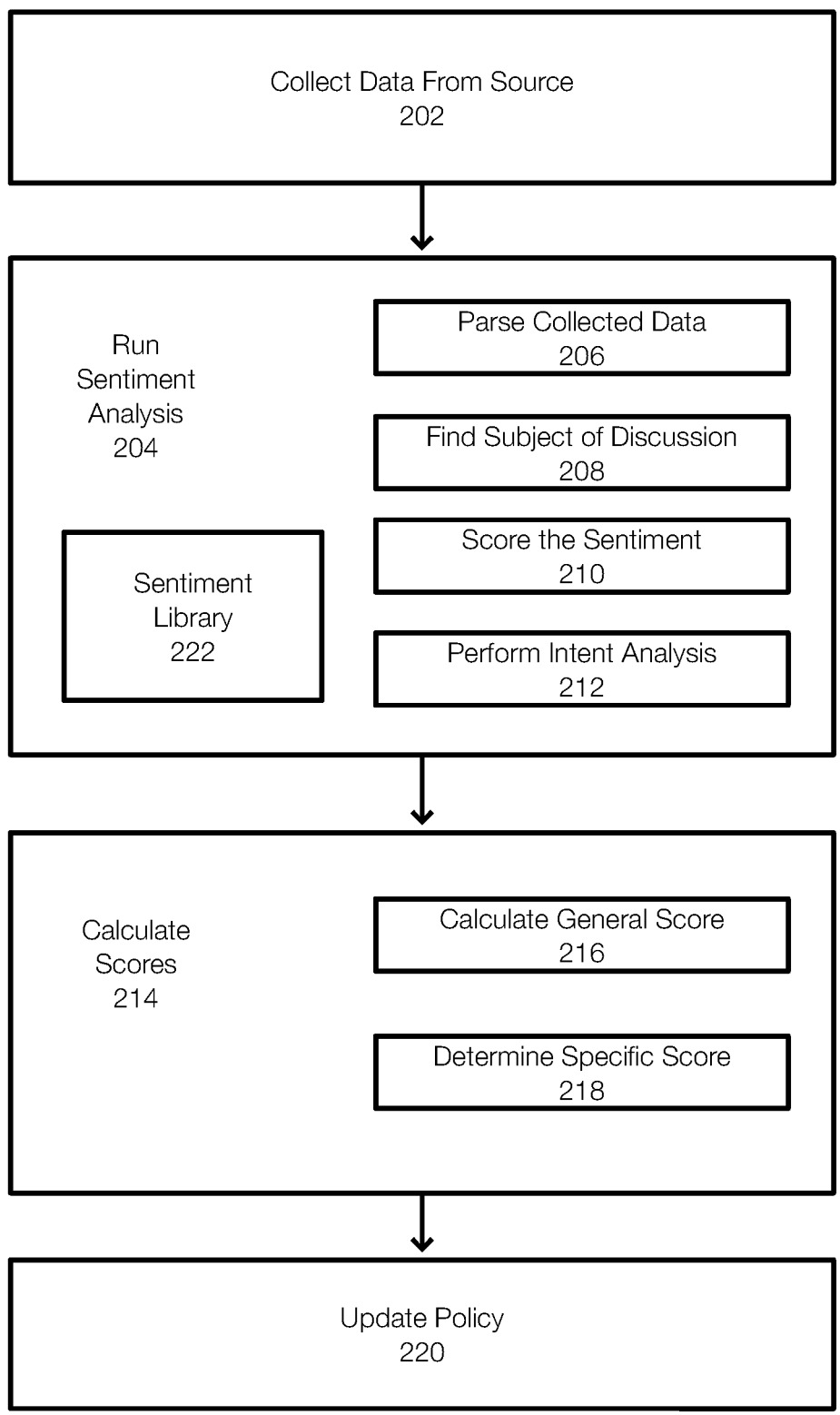
FIG. 2 illustrates an example of a flow diagram for performing threat protection operations including cyber-threat protection operations.

FIG. 2 illustrates an example of a method for performing cyber-threat data protection operations. The method typically begins by collecting 202 data from at least one source. In this example, the sources may include forums, chatrooms or other sites or data on the darknet, darkweb or in other locations or networks. The data may be collected by, for example, bots configured to traverse the darknet or other locations or networks. The data from the sources (which may include the public internet), may be collected in an ongoing manner. Thus, data is continually collected for sentiment analysis.

The collected data may be stored can be stored in different manners. For example, the data collected from a particular forum (or from a particular user/username) may be stored as a time series with respect to specific users. This may allow changes in tone or sentiment of the user to be reflected in the data over time.

Next, a sentiment analysis is run 204 or performed. The sentiment analysis may include multiple steps. NLP methods are an example of sentiment analysis. For example, NLP methods include relating, by way of example and not limitation, thoughts, behavior, patterns of expression to specific outcomes. In one example, sentiment analysis may rely on experiences or on machine learning. A user that expresses a desire to send a worm to an organization may be less likely to actually send the worm compared to a user that expresses the same desire multiple times in one or more forums.

The sentiment analysis may be able to associate expressions of sentiment to various outcomes and may be able to learn from history. For example, an attack on by a particular user on a certain industry or on a specific target can be related to that user's sentiments. This may assume that the user can actually be associated with the attack or reasonably associated with the attack. This type of information allows the sentiment analysis to take comments from this user more seriously in subsequent comments. The sentiment analysis may allow these expressions to be analyzed and associated with outcomes or potential outcomes.

More generally, sentiment analysis may determine, for example, whether a user's comment is positive, negative, or neutral. Further, the sentiment analysis may associate these comments to categories, topics, organizations, industries, or the like.

These steps can be performed in different orders, concurrently, and are often run repeatedly to account for newly acquired data. In one example, the collected data is parsed 206. In one example, the collected data is parsed in order to order or organize the collected into data based on, by way of example only, discussion, thread, or subject. This allows the collected information to be organized according to forum, user, or other factor.

Once the collected data is parsed, the resulting documents (e.g., text documents) can be broken down into component parts and each sentiment-bearing phrase can be identified. In one example, these phrase are scored. Consider the following examples:

A) I want to utterly destroy the banking industry with an extremely malicious worm.

B) I want to send a worm to a bank.

Both of these sentences discuss the subject of sending a worm to a bank or to a banking industry. However, it is clear that the sentiment in the sentence A is more negative and aggressive and seems to have more intent. While a person can rather quickly distinguish the sentiment expressed in these sentences, embodiments of the invention allow the sentiment to be scored.

In one example, the data protection system may provide a sentiment library 222. In some examples, the library 222 may be seeded with rules and/or words that have already been scored. However, the library 222 can be updated, altered or changed (e.g., add/remove words or phrases, set default scores, add/remove rules). Further, there may be a library for each supported language.

The subject of the discussion is then determined or found 208. This may be found based on the forum metadata or based on the comments or text. For example, a user may comment "I'd like to hack into a bank". The subject may be hacking and this comment can be associated with a specific user. This is also an expression of sentiment.

Next, the sentiment as expressed in the comments or data associated with a user are scored 210. The score may depend on the user, the user's comments, the forum or source, the timing of the comments, or the like or combination thereof. The scores assigned to the user's sentiments may depend on the number of times a sentiment is expressed, the number of forums in which the sentiment is expressed, the timing, the identification of a particular target or of a general industry, or the like.

When scoring the sentiment, the sentiment analysis may use predefined rules. For example, these rules may contemplate the nearness of words. The nearness of bank to destroy or the nearness of bank to worm may be used in assigning a score to the sentiment.

Using nearness, parts of speech, and the like can result in scoring 210 the sentiment. In one example, an intent analysis is performed 212. The intent analysis further involves assigning scores to more than simply a document The scoring process should evaluate the entire sentence or comment because there could be conflicting sentiments. In this example, phrases or words that contribute to a positive or negative score will be considered. In other words, the sentiment analysis can also account for text or phrases that intensify the comment. Consider the following example:

C) The worm you developed is super destructive, but it is easily detected.

In this sentence, destructive modifies worm. This may result in a certain score. However, the term super tends to intensify the comments and may result in a higher score. At the same time, the relationship of detected to worm may tend to lower the score. The term easily may further reduce the score as it intensifies the terms detected. From a risk perspective, the sentiment analysis may determine that the threat is real but may be easily defeated. This is an example of scoring using multiple layers of analysis.

Next, scores are calculated 214 based on the sentiment analysis. A general score may be calculated 216. A higher score (depending on how the scoring is configured) compared to a normal score corresponds to a higher risk. A specific score per industry, per business can also be determined 218 where the subject of discussion relates to the industry/business.

Based on the scores, which reflect risk, the policy may be updated 220. A lower level risk may indicate that a primary data storage system is at risk. In this case the data protection system may complete backup of critical applications and stop backup of non-critical applications.

For example, the data collected from the source(s) may include a sentiment. In one example, a sentiment may be a specific comment, a specific comment of a specific user, or the like. By way of example only, the score given to the collected data or portions thereof or the sentiment may range from −1 to +1. A score of 0 may be normal and may be associated with normal risk. A score of −1 may be a very negative sentiment and reflects high risk. A score of +1 may be a very positive sentiment and may reflect no risk. This range can be divided into ranges or associated with predetermined values. For example, a score of −0.3 may result in a first policy change (e.g., limit access to the backup storage to predetermined windows of time). A score of −0.5 may result in a more protective policy change (e.g., prevent all access to the backup storage). The values at which the backup policy changes can be set by a user. Further, other scoring procedures can be used. The scoring may be logarithmic or linear, by way of example only.

A particular phrase may be scored by assessing parts and then summing the results. For example, the subject may receive a score, the descriptors, nearness of certain words, negators, intensifiers, tonality, or the like may receive other scores. The scores of parts of a document or the whole document may also be weighted. For example, the phrase "I really hate Banks" would receive a different score than the phrase "I hate banks" because of the term "really", its nearness to the term "hate" and the negative tonality. The phrase I hate banks, but I'm really happy with my branch" would receive yet another score. In this case, the term really does not modify the term "hate". These types of relationships and the analysis can impact the overall score given to a particular sentiment. The score can be converted to a risk and actions to protect data can be performed based on the assessed risk.

Scoring a sentiment can be performed in a large number of ways and using different scales based on information available. However, embodiments of the invention allow these scores and sentiment analysis to be leveraged in data protection operations. Further, embodiments of the invention may change the scoring based on risks specific to data protection operations. The libraries or scores of portions of the sentiments or of the sentiments as a whole may be determined by a user of the data protection system, for example or based on an understanding of the potential risk. Further, embodiments of the invention may assess the same risk differently for production data versus backup data. Certain actions may be taken based on threshold levels or scores. Further, the actions can be taken immediately or automatically without user input. An administrator may be advised of the action taken or may be requested to authorize an action if the action is not automatically taken.

If there is a risk that the cyber-security issue will harm the protection or secondary storage, the system may isolate the protection storage. In an IRS system, all current backups may stop and networking to the IRS system may be closed.

A risk to the secondary or backup storage may trigger locking data in retention mode, which makes it more difficult to alter the data in the secondary storage. The changes in the policy may be maintained for a predetermined period of time, until the risk decreases, or based on other factors.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing data protection for backup storage, the method comprising:
   collecting data from a source;
   parsing the collected data, wherein portions of the collected data associated with specific users are stored as time series data for each of the specific users;
   performing a sentiment analysis on the collected data, wherein the sentiment analysis includes detecting changes in sentiments of the specific users based on the time series data;
   performing an intent analysis on the collected data, wherein the intent analysis accounts for portions of the data that intensify a sentiment of the data;
   scoring the collected data based on the sentiment analysis and the intent analysis with a score to determine a risk associated with the collected data, wherein the portions of the data that intensify the sentiment increase a score of the collected data; and
   updating a backup policy associated with the backup storage based on the determined risk.

2. The method of claim 1, further comprising collecting the data from forums, websites, or chatrooms in the darknet.

3. The method of claim 1, wherein performing a sentiment analysis includes
   performing a language analysis on the collected data.

4. The method of claim 3, further comprising parsing the collected data into at least one document.

5. The method of claim 4, further comprising determining a subject of the collected data.

6. The method of claim 3, further comprising scoring the collected data based on the language analysis.

7. The method of claim 6, further comprising scoring the collected data per user.

8. The method of claim 1, wherein the determined risk indicates that a primary data storage system is at risk, further comprising completing backup of critical applications and stopping backup of non-critical applications.

9. The method of claim 1, wherein the determined risk indicates that the backup storage is at risk, further comprising automatically stopping all backups and closing the backup device to all networking.

10. The method of claim 1, wherein the determined risk indicates that the backup storage is at risk, further comprising locking data in a retention mode.

11. A non-transitory computer readable medium comprising computer executable instructions that, when executed, perform a method for performing data protection for backup storage, the method comprising:
    collecting data from a source;
    parsing the collected data, wherein portions of the collected data associated with specific users are stored as time series data for each of the specific users;
    performing a sentiment analysis on the collected data, wherein the sentiment analysis includes detecting changes in sentiments of the specific users based on the time series data;
    performing an intent analysis on the collected data, wherein the intent analysis accounts for portions of the data that intensify a sentiment of the data;
    scoring the collected data based on the sentiment analysis and the intent analysis with a score to determine a risk associated with the collected data, wherein the portions of the data that intensify the sentiment increase a score of the collected data; and
    updating a backup policy associated with the backup storage based on the determined risk.

12. The non-transitory computer readable medium of claim 11, further comprising collecting the data from at least one of forums, websites, or chatrooms in the darknet or other network.

13. The non-transitory computer readable medium of claim 11, wherein performing a sentiment analysis includes performing a language analysis on the collected data.

14. The non-transitory computer readable medium of claim 13, further comprising parsing the sentiment into at least one document.

15. The non-transitory computer readable medium of claim 14, further comprising determining a subject of the sentiment and determining if the subject is associated with an industry or a specific entity.

16. The non-transitory computer readable medium of claim 15, further comprising scoring the sentiment based on the language analysis and the subject.

17. The non-transitory computer readable medium of claim 11, wherein the determined risk indicates that a primary data storage system is at risk, further comprising completing backup of critical applications and stopping backup of non-critical applications.

18. The non-transitory computer readable medium of claim 11, wherein the determined risk indicates that the backup storage is at risk, further comprising automatically stopping all backups and closing the backup device to all networking.

19. The non-transitory computer readable medium of claim 11, wherein the determined risk indicates that the backup storage is at risk, further comprising locking data in a retention mode.

* * * * *